(12) United States Patent  (10) Patent No.: US 8,313,801 B2
Guschl  (45) Date of Patent: Nov. 20, 2012

(54) COATING FORMULATION AND APPLICATION OF ORGANIC PASSIVATION LAYER ONTO IRON-BASED RARE EARTH POWDERS

(75) Inventor: Peter Christopher Guschl, Sommerville Grandeur (SG)

(73) Assignee: Magnequench, Inc., Singapore (SG)

( * ) Notice: Subject to any disclaimer, the term of this patent is extended or adjusted under 35 U.S.C. 154(b) by 200 days.

(21) Appl. No.: 12/559,975

(22) Filed: Sep. 15, 2009

(65) Prior Publication Data

US 2010/0068377 A1     Mar. 18, 2010

Related U.S. Application Data

(60) Continuation of application No. 12/041,077, filed on Mar. 3, 2008, now abandoned, which is a division of application No. 10/996,348, filed on Nov. 23, 2004, now Pat. No. 7,390,579.

(60) Provisional application No. 60/524,633, filed on Nov. 25, 2003.

(51) Int. Cl.
    *B05D 7/00*     (2006.01)
(52) U.S. Cl. .................................................. 427/212
(58) Field of Classification Search ................ 427/212
    See application file for complete search history.

(56) References Cited

U.S. PATENT DOCUMENTS

| | | | | |
|---|---|---|---|---|
| 4,876,305 A | * | 10/1989 | Mazany | ................ 524/401 |
| 5,087,302 A | | 2/1992 | Lin et al. | |
| 5,096,741 A | * | 3/1992 | Kobayashi et al. | ........ 427/127 |
| 5,272,008 A | * | 12/1993 | Shain et al. | ............... 428/407 |
| 5,395,695 A | | 3/1995 | Shain et al. | |
| 5,744,433 A | | 4/1998 | Storstrom et al. | |
| 5,888,416 A | | 3/1999 | Ikuma et al. | |
| 6,346,565 B1 | * | 2/2002 | Daifuku et al. | ............. 524/436 |
| 2010/0068377 A1 | | 3/2010 | Guschl | |

FOREIGN PATENT DOCUMENTS

| | | |
|---|---|---|
| EP | 0242187 | 10/1987 |
| EP | 1049111 | 11/2000 |
| JP | 6041202 | 4/1985 |
| JP | 64041201 | 2/1989 |

(Continued)

OTHER PUBLICATIONS

Chen et al., "The Effect of the Coupling Agent on the Packing Density and Corrosion Behavior of NdFeB and SmCo Bonded Magnets," *J. Appl. Phys.* 85:8:5684-5686 (1999).

(Continued)

*Primary Examiner* — Michael Cleveland
*Assistant Examiner* — Robert Vetere
(74) *Attorney, Agent, or Firm* — Jones Day

(57) ABSTRACT

The present disclosure relates to coating formulations for neodymium-iron-boron type magnetic powders manufactured from rapid solidification processes for the purpose, inter alia, of corrosion and oxidation resistance when exposed to aggressive environments. The coating formulation preferably contains an epoxy binder, curing agent, an accelerating agent, and a lubricant. By incorporating coupling agents and optionally, other specialty additives with the magnetic powder and the organic epoxy components, additional oxidation and corrosion prevention, enhanced adhesion and dispersion between the filler and matrix phases can be achieved. This disclosure relates to all such rare earth-transition metal-boron (RE-TM-B) powders produced by rapid solidification and encompasses both the bonded magnet products that include combinations of the materials mentioned and the application processes.

23 Claims, 6 Drawing Sheets

FOREIGN PATENT DOCUMENTS

| | | |
|---|---|---|
| JP | 3165504 | 7/1991 |
| JP | 03222303 | 10/1991 |
| JP | 4011701 | 1/1992 |
| JP | 04-157705 | 5/1992 |
| JP | 04257203 | 9/1992 |
| JP | 05-234727 | 9/1993 |
| JP | 05-308007 | 11/1993 |
| JP | 11111514 | 4/1999 |
| JP | 0058313 | 2/2000 |
| JP | 01110620 | 4/2001 |
| JP | 02033209 | 1/2002 |
| JP | 02363419 | 12/2002 |
| JP | 03086411 | 3/2003 |
| JP | 03142308 | 5/2003 |
| JP | 03297619 | 10/2003 |
| RU | 2128100 | 3/1999 |
| WO | WO 99/62995 | 12/1999 |
| WO | WO 02/076613 | 10/2002 |
| WO | WO 2005/052960 | 6/2005 |

OTHER PUBLICATIONS

Guschl et al., "Effects of a Nd-Fe-B Magnetic Filler on the Crystallization of Poly(phenylene sultide)," *J. Appl. Poly. Sci.*, 83:1091-1102 (2002).

Xiao et al., "High Performance, Lightweight Thermoplastic/Rare Earth Alloy Magnets," *Mat. Res. So. Symp. Proc.* 577:75-80 (1999).

\* cited by examiner

COATING FORMULATION AND APPLICATION OF ORGANIC PASSIVATION LAYER ONTO IRON-BASED RARE EARTH POWDERS

CROSS-REFERENCE TO RELATED APPLICATIONS

This application is a continuation of U.S. patent application Ser. No. 12/041,077, now abandoned, filed Mar. 3, 2008, which is a divisional of U.S. application Ser. No. 10/996,348, now U.S. Pat. No. 7,390,579, Nov. 23, 2004, which claims benefit of U.S. Provisional Application Ser. No. 60/524,633, filed Nov. 25, 2003, each of which are incorporated by reference herein in their entireties.

FIELD OF THE INVENTION

The present invention relates to coating formulations for rare earth-transition metal-boron (RE-TM-B) magnet materials, such as neodymium-iron-boron type magnetic powders manufactured from rapid solidification processes for, among other things, the purpose of corrosion and/or oxidation resistance when exposed to aggressive environments or for passivation. The present invention also relates to methods of applying coating formulations is to rare earth-transition metal-boron (RE-TM-B) magnet powders.

BACKGROUND OF THE INVENTION

Isotropic polymer bonded rare earth permanent magnets have been used in various advanced motors and electronic devices. With the miniaturization of motors and electronic devices, it is necessary to reduce the size of magnets used. To enable effective miniaturization and efficient energy or signal output, it is essential for these applications to demand magnets of high flux densities. Factors determining the flux density of isotropic polymer bonded magnets can be divided into two parts: the type of magnet materials used and the volume fraction of the magnet materials in these polymer bonded magnets.

The criteria for selecting the type of magnetic materials are strongly influenced by the operation conditions demanded by the given applications. The polymer binder used for making polymer bonded magnets must be able to provide sufficient mechanical strength to hold magnet powder together and maintain the designed shape specification up to the intended operation temperature and to sustain that operation temperature without softening, deforming or breaking. The magnetic materials must provide sufficient flux to sustain the desired properties at the operation temperature without substantial loss of magnetization. The flux aging loss of a magnet material provides an indication of the magnet material's stability to heat and protection from corrosive and oxidative environments, which can affect the magnetic materials' ability to retain magnetic flux over time durations at certain temperatures. The flux aging loss of a bonded magnet ultimately determines the magnet's utility in various applications, and should be minimized if the bonded magnet is to be used for high temperature applications. The oxidative or corrosive degradation of the constituent materials and change in overall magnetic properties should be minimized to enhance the utility of the bonded magnets.

The combination and amounts of the organic and magnetic materials should allow the desired properties previously discussed to be optimized and attained. The amount of magnet powder in the polymer-bonded magnets, typically stated as a mass or volume fraction, is determined by the polymer binder type, molecular weight of the polymer binder, and the methodology applied in order to combine said materials effectively. Depending on the molding method, various polymers are available for making isotropic bonded magnets. Compression molding, injection molding, extrusion and calendering are well-known means for producing polymer-bonded magnets in commercial quantities.

Compression-molded or compacted magnets allow magnets to reach high, desirable volume fraction (greater than 83%) required to achieve strong magnetic properties. Typically, thermosetting polymers, such as, epoxies, phenolics, and other crosslinkable resins with their respective curing agents are used with the ideology of producing magnets that will less affected by heat or chemical attack than the non-coated powders. These materials are initially low molecular weight substances that can be easily applied as coatings for the magnetic powders. The components can be molded and cured to produce magnets that are resistant to high temperatures (typically, not much greater than 250° C.) and chemical solvents. The extent of crosslinking or the crosslink density of the thermosetting binder governs the coating's overall resistance to oxidation and corrosion as well as the mechanical strength of the final magnet.

At high loadings of solid filler the oxidation potential of the magnetic powders increases and becomes deleterious to the magnetic properties because of the low degree of organic protection, where the industry term "loading" refers to the proportion of magnet powder in the final magnet product. Chemical additives are introduced into the bonded magnet system in order to alleviate oxidative effects on the metallic filler particles. U.S. Pat. No. 5,888,416 to Ikuma et al. discloses the use of various chelating agents and antioxidants in the rare-earth bonded magnets of polyphenylene sulfide (PPS), nylon 12 (polyimide), and polyethernitrile (liquid crystal polymer) thermoplastic binders for use in extruded magnet compositions. U.S. Pat. No. 5,395,695 to Shain et al. discloses incorporating successive layers of an antioxidant, an epoxy novolac resin, and polystyrene onto the magnet material for improvements in oxidation resistance, with an emphasis on the sequential layering of the components. Xiao et al. and Guschl et al. describe the benefits of incorporating an aminosilane coupling agent onto the powders within a polyphenylene sulfide binder. See J. Xiao and J. U. Otaigbe, "High Performance, Lightweight Thermoplatic/Rare Earth Alloy Magnets," *Mat. Res. So. Symp. Proc.*, 577:75-80 (1999); P. C. Guschl, H. S. Kim, and J. U. Otaigbe, "Effects of a Nd—Fe—B Magnetic Filler on the Crystallization of Poly (phenylene sulfide)," *J. Appl. Poly. Sci.*, 83:1091-1102 (2002). However, the results disclosed in these references were based solely on magnets with powder loadings on the order of about 80%, which is lower than those achievable in compression-molding magnets (on the order of about 90% or more). U.S. Pat. No. 4,876,305 to Mazany ("Mazany") describes the application of a combination of aminosilanes and epoxysilane coupling agents with epoxy resins for oxidation resistance, comparing oxidation rates to treated and non-treated samples. The concentrations of magnetic material in the magnets disclosed in Mazany were fairly low, the magnetic properties of the resultant magnets, e.g., the flux aging loss, are not considered relevant.

U.S. Pat. No. 5,087,302 to Lin et al. discloses a process where an organotitanate is added to coarse Nd—Fe—B powders during a milling step to produce sintered magnets with improved magnetic remnance, coercivity and oxidation resistance. However, since the milled magnet powder-organotitanate mixture is subjected to a high-temperature to degassing technique in an inert atmosphere in order to manufacture the sintered NdFeB magnets, the organotitanate is removed or "degassed" from the metallic powders.

Recently published coupling agents that have been utilized in bonded magnet systems are the organotitanates and organozirconates. Several Japanese patents describe the use of these agents and NdFeB powders with mainly nylon 12 resin, epoxy resins, PPS resin, and other such thermoplastic or thermosetting binders. See, e.g., JP-03165504 to T. Hitoshi et al.; JP-03222303 to M. Yoshihiko; JP-04011701 to M. Yoshihiko; and JP-04257203 to T. Hitoshi et al. These disclosures are directed to applications to injection-molding and extrusion-produced bonded magnets, because the specification of the material types and compositions disclosed therein fall well below the magnetic powder loadings disclosed in the present invention. Chen et al. disclose that a diaminoethylene-based titanate incorporated into a NdFeB-epoxy-bonded magnet system improved the bonding of the components and overall specific density of the magnet. See Q. Chen, J. Asuncion, J. Landi, and B. M. Ma, "The Effect of the Coupling Agent on the Packing Density and Corrosion Behavior of NdFeB and SmCo Bonded Magnets," *J. Appl. Phys.*, 85:8: 5684-5686 (1999). However, no mention is made of the effects of the titanate on the flux aging loss of the magnet material or of the method in which the titanate was incorporated into the system. The present invention provides a more effective technique for protecting rare earth-transition metal-boron magnetic materials through a performing liquid coating procedure on the rare earth-transition metal-boron magnet powders. The present invention is applicable, for example, to compression-molding magnets.

SUMMARY OF THE INVENTION

In a first embodiment, the present invention provides a rapidly solidified rare earth-transition metal-boron magnet material, comprising a rare earth-transition metal-boron magnet powder coated with a coating comprising, in an amount by weight of the magnet powder, of about 0.1 weight percent to about 1 weight percent of an organotitanate or organozirconate coupling agent, about 0.18 weight percent to about 4.46 weight percent of an epoxy resin, about 0.01 weight percent to about 0.27 weight percent of an amine-based hardener, about 0.004 weight percent to about 0.09 weight percent of an accelerator, and about 0.003 weight percent to about 0.27 weight percent of a lubricant. The general form of the coupling agent is:

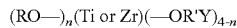

where R is a neopentyl(diallyl), dioctyl, or (2,2-diallyloxymethyl)butyl group, Ti or Zr has a coordination number of 4, R' is a phosphito, pyrophosphato or cyclic pyrophosphato segment, and Y is a dioctyl or ditridecyl end group, with $1 \leq n \leq 4$. In first aspect according to the first embodiment, the invention provides a rapidly solidified rare earth-transition metal-boron magnet material, where the coating comprises about 0.1 weight percent to about 1 weight percent of the organotitanate or organozirconate coupling agent, about 0.43 weight percent to about 3 weight percent of the epoxy resin, about 0.025 weight percent to about 0.18 weight percent of the amine-based hardener, about 0.009 weight percent to about 0.06 weight percent of the accelerator, and about 0.009 weight percent to about 0.19 weight percent of the lubricant. In specific embodiment of the invention, the coating formulations of the first embodiment of the invention consists essentially of the recited components in the recited percentage ranges.

In a second embodiment, the present invention provides a rapidly solidified rare earth-transition metal-boron magnet material, comprising a rare earth-transition metal-boron magnet powder coated with a coating comprising, in an amount by weight of the magnet powder, of about 0.225 weight percent to about 4.25 weight percent of epichlorohydrin/cresol novolac epoxy resin, about 0.01 weight percent to about 0.26 weight percent of dicyandiamide hardener, about 0.005 weight percent to about 0.085 weight percent of an to aromatic, tertiary amine accelerator, about 0.004 weight percent to about 0.27 weight percent of zinc stearate lubricant, and about 0.35 weight percent to about 0.75 weight percent of an organotitanate coupling agent of the form

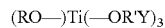

where R is a neopentyl(diallyl), Ti has a coordination number of 4, R' is a pyrophosphato segment, and Y is a dioctyl end group. In a first aspect of the second embodiment, the invention provides a rapidly solidified rare earth-transition metal-boron magnet material, where the coating comprises about 0.68 weight percent to about 2.76 weight percent of epichlorohydrin/cresol novolac epoxy resin, about 0.04 weight percent to about 0.17 weight percent of dicyandiamide hardener, about 0.01 weight percent to about 0.055 weight percent of the aromatic, tertiary amine accelerator, about 0.01 weight percent to about 0.175 weight percent of the zinc stearate lubricant. In specific embodiment of the invention, the coating formulations of the second embodiment of the invention consists essentially of the recited components in the recited percentage ranges.

In a third embodiment, the invention provides a rapidly solidified rare earth-transition metal-boron magnet material, comprising a rare earth-transition metal-boron magnet powder; and an organotitanate or organozirconate coupling agent of the general form

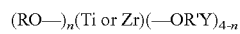

where R is a neopentyl(diallyl), dioctyl, or (2,2-diallyoxymethyl)butyl group, Ti or Zr has a coordination number of 4, R' is a phosphito, pyrophosphato or cyclic pyrophosphato segment, and Y is a dioctyl or ditridecyl end group, with $1 \leq n \leq 4$; where the coupling agent is present in an amount by weight of the magnet powder of about 0.1 weight percent to about 1 weight percent. In a first aspect of the third embodiment, the invention provides a rapidly solidified rare earth-transition metal-boron magnet material, where the organotitanate or organozirconate coupling agent is of the form:

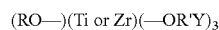

where R is a neopentyl(diallyl) group, Ti has a coordination number of 4, R' is a pyrophosphato segment, and Y is a dioctyl end group, where the coupling agent is present in an amount by weight of the magnet powder of about 0.35 weight percent to about 0.75 weight percent. In specific embodiment of the invention, the coating formulations of the third embodiment of the invention consists essentially of the recited components in the recited percentage ranges.

In a fourth embodiment, the invention provides a rapidly solidified rare earth-transition metal-boron magnet material, comprising a rare earth-transition metal-boron magnet powder comprising a pre-coating of an organotitanate or organozirconate coupling agent of the general form:

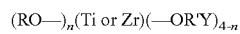

where R is a neopentyl(diallyl), dioctyl, or (2,2-diallyloxymethyl)butyl group, Ti or Zr has a coordination number of 4, R' is a phosphito, pyrophosphato or cyclic pyrophosphato segment, and Y is a dioctyl or ditridecyl end group, with $1 \leq n \leq 4$, present in an amount by weight of the magnet powder of about 0.1 weight percent to about 1 weight percent; and a further coating comprising, in an amount by total weight of the final mixture, of about 0.18 weight percent to about 4.46 weight percent of an epoxy resin, about 0.01 weight percent to about 0.27 weight percent of an amine-based hardener, about 0.004 weight percent to about 0.09 weight percent of an accelerator, and about 0.003 weight percent to about 0.27 weight percent of a lubricant. In a first aspect of the fourth embodiment, the invention provides a rapidly solidified rare earth-transition metal-boron magnet material, where the further coating comprises about 0.43 weight percent to about 3 weight percent of epoxy resin, about 0.025 to weight percent to about 0.18 weight percent of amine-based hardener, about 0.009 weight percent to about 0.06 weight percent of accelerator, and about 0.009 weight percent to about 0.19 weight percent of lubricant. In specific embodiment of the invention, the coating formulations of the fourth embodiment of the invention consists essentially of the recited components in the recited percentage ranges.

In a fifth embodiment, the invention provides a rapidly solidified rare earth-transition metal-boron magnet material, comprising a rare earth-transition metal-boron magnet powder comprising a pre-coating of an organotitanate coupling agent of the form (RO—)Ti(—OR'Y)$_3$
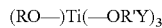

where R is a neopentyl(diallyl) group, Ti has a coordination number of 4, R' is a pyrophosphato segment, and Y is a dioctyl end group, present in an amount by weight of the magnet powder of about 0.35 weight percent to about 0.75 weight percent; and a further coating comprising, in an amount by weight of the final mixture, of about 0.225 weight percent to about 4.25 weight percent of epichlorohydrin/cresol novolac epoxy resin, about 0.01 weight percent to about 0.26 weight percent of dicyandiamide hardener, about 0.005 weight percent to about 0.085 weight percent of an aromatic, tertiary amine accelerator, and about 0.004 weight percent to about 0.27 weight percent of zinc stearate lubricant. In a first aspect of the fifth embodiment of the invention, the invention provides a rapidly solidified rare earth-transition metal-boron magnet material comprising the pre-coating of the organotitanate coupling agent at a concentration range of 0.35-0.75% by weight of the rare earth-transition metal-boron powder, and the further coating of, by total weight, 0.680%-2.76% epichlorohydrin/cresol novolac epoxy resin, 0.040-0.170% dicyandiamide hardener, 0.010-0.055% of the aromatic, tertiary amine accelerator, 0.010-0.175% zinc stearate lubricant. In specific embodiment of the invention, the coating formulations of the fifth embodiment of the invention consists essentially of the recited components in the recited percentage ranges.

In a sixth embodiment, the invention provides a rapidly solidified rare earth-transition metal-boron magnet material, comprising a rare earth-transition metal-boron magnet powder coated with a coating comprising, in an amount by weight of the magnet powder, of about 0.65 weight percent to about 2.5 weight percent of an epoxy resin, about 0.035 weight percent to about 0.15 weight percent of an amine-based hardener, about 0.01 weight percent to about 0.05 weight percent of an accelerator, about 0.04 weight percent to about 0.16 weight percent of a lubricant, about 0.001 weight percent to about 0.3 weight percent of an organoclay, and about 0.35 weight percent to about 0.75 weight percent of an organotitanate or organozirconate coupling agent of the general form (RO—)$_n$(Ti or Zr)(—OR'Y)$_{4-n}$
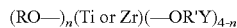

where R is a neopentyl(diallyl), dioctyl, or (2,2-diallyoxymethyl)butyl group, Ti or Zr has a coordination number of 4, R' is a phosphito, pyrophosphato or cyclic pyrophosphato segment, and Y is a dioctyl or ditridecyl end group, with $1 \leq n \leq 4$. In a first aspect of the fifth embodiment, the invention provides a rapidly solidified rare earth-transition metal-boron magnet material, wherein the coupling agent is an organotitanate coupling agent of the form (RO—)Ti(—OR'Y)$_3$
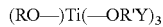

where R is a neopentyl(diallyl), Ti has a coordination number of 4, R' is a pyrophosphato segment, and Y is a dioctyl end group. In a first aspect of the fifth embodiment, the epoxy resin is epichlorohydrin/cresol novolac epoxy resin, the amine-based hardener is dicyandiamide hardener, the accelerator is an aromatic, tertiary amine accelerator, the lubricant is zinc stearate, and the organoclay comprises bis (hydroxyethyl) methyl tallow alkyl ammonium salts with bentonite. In a second aspect of the fifth embodiment, the coating of the rapidly solidified rare earth-transition metal-boron magnet material comprises about 0.001 weight percent to about 0.3 weight percent of an organoclay comprising bis (hydroxyethyl) methyl tallow alkyl ammonium salts with bentonite; and about 0.35 weight percent to about 0.75 weight percent of an organotitanate coupling agent of the form (RO—)Ti(—OR'Y)$_3$
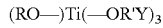

where R is a neopentyl(diallyl), Ti has a coordination number of 4, R' is a pyrophosphato segment, and Y is a dioctyl end group. In specific embodiment of the invention, the coating formulations of the sixth embodiment of the invention consists essentially of the recited components in the recited percentage ranges.

In a seventh embodiment, the invention provides a rapidly solidified rare earth-transition metal-boron magnet material, comprising a rare earth-transition metal-boron magnet powder; which has been pre-coated with a POSS additive in an amount by weight of the magnet powder of about 0.1 weight percent to about 5 weight percent; after which a further coating is applied, which comprises, in an amount my total weight of the mixture, of about 0.54 weight percent to about 2.75 weight percent of an epoxy resin, about 0.03 weight percent to about 0.17 weight percent of an amine-based hardener, about 0.01 weight percent to about 0.06 weight percent of an accelerator, about 0.035 to about 0.175 weight percent of a lubricant, about 0.35 weight percent to about 0.75 weight percent of an organotitanate or organozirconate coupling agent of the general form (RO—)$_n$(Ti or Zr)(—OR'Y)$_{4-n}$
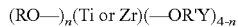

where R is a neopentyl(diallyl), dioctyl, or (2,2-diallyloxymethyl)butyl group, Ti or Zr has a coordination number of 4 or 5, R' is a phosphito, pyrophosphato or cyclic pyrophosphato segment, and Y is a dioctyl or ditridecyl end group, with $1 \leq n \leq 4$, about 0.003 weight percent to about 0.055 weight percent of an organoclay, and about 0.003 weight percent to about 0.015 weight percent of an antioxidant agent. In a first aspect of the seventh embodiment, the invention provides a rapidly solidified rare earth-transition metal-boron magnet material, where the coupling agent is an organotitanate coupling agent of the form (RO—)Ti(—OR'Y)$_3$
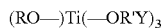

where R is a neopentyl(diallyl), Ti has a coordination number of 4, R' is a pyrophosphato segment, and Y is a dioctyl end group. In specific embodiment of the invention, the coating formulations of the seventh embodiment of the invention consists essentially of the recited components in the recited percentage ranges.

In a second aspect of the seventh embodiment, the POSS additive is trisilanolphenyl or epoxycyclohexyl POSS. In a third aspect of the seventh embodiment, the antioxidant agent is a butylated reaction product of p-cresol and dicyclopentadiene antioxidant. In a fourth aspect of the seventh embodiment, the epoxy resin is epichlorohydrin/cresol novolac epoxy resin, the amine-based hardener is dicyandiamide hardener, the accelerator is an aromatic, tertiary amine accelerator, the lubricant is zinc stearate lubricant; and the organo clay additive is bis (hydroxyethyl) methyl tallow alkyl ammonium salts with bentonite.

In a fifth aspect of the seventh embodiment, the pre-coating is a trisilanolphenyl or epoxycyclohexyl POSS in an amount of about 0.1 weight percent to about 1 weight percent, by weight of the magnet powder; and the further coating comprises, by total weight of the mixture, of about 0.54 weight percent to about 2.75 weight percent of epichlorohydrin/cresol novolac epoxy resin, about 0.03 weight percent to about 0.17 weight percent of dicyandiamide hardener, about 0.01 weight percent to about 0.06 weight percent of an aromatic, tertiary amine accelerator, about 0.035 weight percent to about 0.175 weight percent of zinc stearate lubricant, about 0.35 weight percent to about 0.75 weight percent of an organotitanate coupling agent of the form

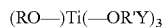

where R is a neopentyl(diallyl), Ti has a coordination number of 4, R' is a to pyrophosphato segment, and Y is a dioctyl end group, about 0.003 weight percent to about 0.07 weight percent of an organoclay comprising bis (hydroxyethyl) methyl tallow alkyl ammonium salts with bentonite, and about 0.003 weight percent to about 0.015 weight percent of a butylated reaction product of p-cresol and dicyclopentadiene antioxidant.

The present invention also provides a process of liquid-coating a rapidly solidified rare earth-transition metal-boron magnet material, comprising the steps of providing a solution comprising a solvent, an organotitanate or organozirconate coupling agent, an epoxy resin, hardener, an accelerator, and a lubricant, wherein said homogeneous solution is a homogeneous 8-25% solution; combining a rare earth-transition metal-boron magnet material with the homogeneous solution to form a slurry mixture; stirring the slurry mixture periodically; and maintaining said slurry mixture at a temperature between 40-60° C., such that said solvent evaporates. In different embodiments, the solvent is acetone or tetrahydrofuran. Various other components can be introduced into to the homogeneous 8-25% solution, including an organoclay, an antioxidant agent, an organotitanate or organozirconate coupling agent, or both types f coupling agents. In a specific embodiment, the mixture is maintained at a temperature between 50-60° C. In an alternate embodiment, the rare earth-transition metal-boron material is pre-treated by dissolving an organotitanate or an organozirconate coupling agent in acetone to form a 50% solution; adding the rare earth-transition metal-boron powder into the solution; and evaporating the acetone solvent to produce the pre-treated rare earth-transition metal-boron powder. In a specific embodiment, the solvent is tetrahydrofuran, and the process further comprises pre-treating the rare earth-transition metal-boron powder by dissolving a POSS additive in tetrahydrofuran to form a 50% solution; adding the rare earth-transition metal-boron powder into the solution; and evaporating the tetrahydrofuran to produce said pre-treated rare earth-transition metal-boron powder. In specific embodiment of the process of liquid-coating a rapidly solidified rare earth-transition metal-boron magnet material, the coating consists essentially of the recited components in the recited percentage ranges.

DETAILED DESCRIPTION OF THE INVENTION

Figure 1:
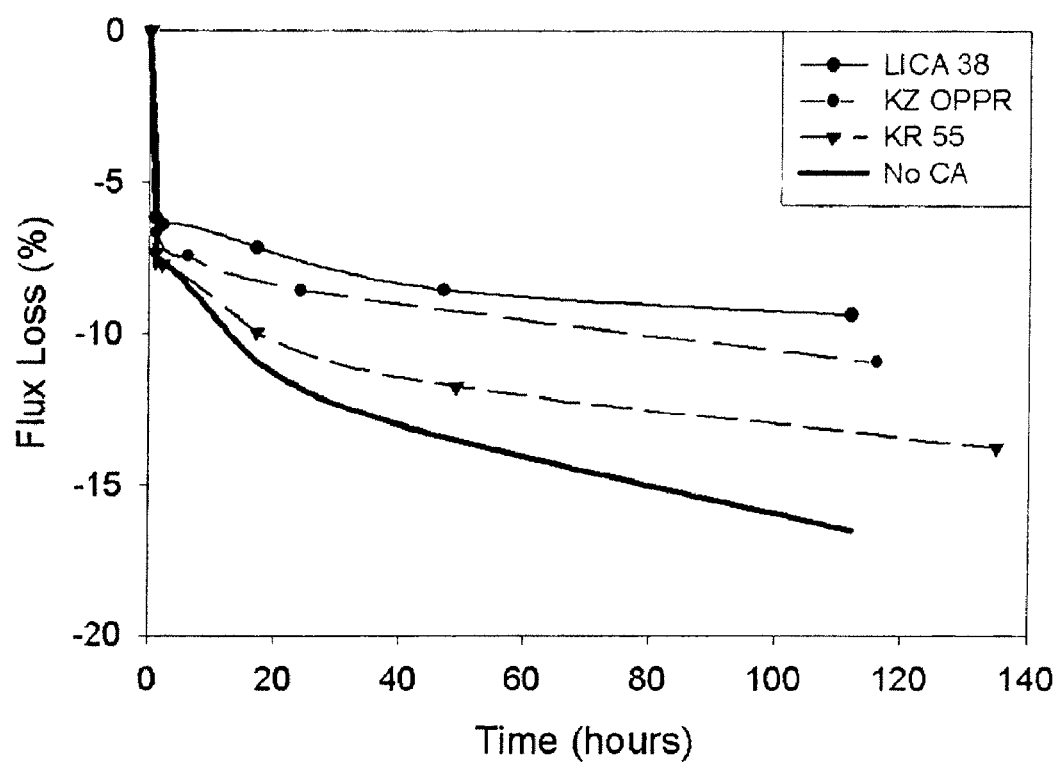
FIG. 1: Flux aging loss at 180° C. after 100 hours of cured PC-2 magnets with and without a coupling agent.

The present invention provides coating formulations for rapidly solidified rare earth-transition metal-boron (RE-TM-B)-type bonded magnetic materials, and methods of applying such formulations to the magnet materials, with emphasis on their protection against oxidation. Specifically, the flux aging loss of any bonded magnet must be minimized in order for high temperature applications to be considered. While not being bound by any specific theory, it is believed that the incorporation of organic materials, such as polymers with the inorganic metallic powders provides a means to passivate and prevent oxidative tendencies by reducing the reactivity of the filler surfaces or by decreasing the permeation of energetic oxygen molecules to the filler surfaces. Additionally, the coated powders allow a higher degree of flexibility and moldability for producing bonded magnets.

The coating formulations and processes of the present invention provide for bonded magnets with higher powder loadings, i.e., higher proportions of magnet materials contained in the final magnet, than achievable from other methods. Prior art references disclose magnets with powder loadings lower than those achievable in the present invention, which is on the order of about 95% to about 99% or more by weight of the magnet. For example, magnets made using, e.g., polyphenylene sulfide (PPS) or nylon 12 (polyamide), such as injection-molded bonded magnets, usually contain only about 85% to about 93% by weight or less of magnet powder, corresponding to about 50-70% by volume.

The prior art for bonded magnets, using polymeric binders, has focused on dry blending techniques. These methods physically mix organic powders, such as thermosetting resins, with the magnetic powders in the absence of solvents. Compaction and/or compression molding are used in order to form the solid magnets by initially fusing the organic powder between the inorganic particles. These resultant magnets contain weakly bound particulates with nonuniformities and, as a result, a degree of porosity, which can be detrimental in terms of oxidation, flux aging loss, and overall magnetic and physical properties.

Liquid coating techniques assuage these problems associated with dry blending by providing a uniform organic layer on the powders. This resulting uniformity provides more effective oxidation protection following the cure reaction of the thermosetting binder. Both liquid and solid, dissolvable resins and other additives are permissible for the application process.

The polymer-coated powders of the present invention have improved thermal stability in comparison to the magnetic powders alone. Further, more effective protection can be achieved through the addition of particular specialty chemical additives. While certain antioxidants can be effective for protective purposes to some extent, the presence of the antioxidants only mildly deters oxygen molecules from reaching the filler surfaces. Because the antioxidant molecules are freely suspended within the binder matrix and deposited on the filler particles (such as in a physisorption process), they have limited ability in oxidation protection. In other words, little to no interaction between thermoplastic binders, filler particles and these additives may occur (such as in a chemisorption). Possible side reactions of binders with reactive epoxide functional groups of epoxy resins may happen if the antioxidant agent contains active amine groups. However, although complete protection from oxidation may not be possible for systems that contain solely antioxidants, their use does aid in oxidation prevention. Accordingly, the inventive formulations may optionally contain antioxidant agents to provide further flux aging loss resistance. Non-limiting examples of antioxidant agents include a butylated reaction product of p-cresol and dicyclopentadiene antioxidant, and tetrakis-[methylene-(3,5-di-tert.-butyl-4-hydroxy-cinnamate)] methane antioxidants.

As used herein, the term "epoxy resins" refer to synthetic uncured or unreacted resins containing epoxide functional groups with an aromatic backbone. Non-limiting examples of epoxy resins include epichlorohydrin/cresol novolac epoxy resin and epichlorohydrin/bisphenol A epoxy resin types. The epoxy-based coated powders with the specialty additives (e.g., coupling agents, antioxidants, etc.) are in the uncured state prior to the manufacture of the final cured magnets.

It has been discovered that coupling agents allow protection by way of altering the powders surface through beneficial chemical or weaker physical (hydrogen) bonding. It is believed that the coupling agents form protective layers on the powder that are compatible and potentially reactive, if appropriately selected, with the surrounding organic passivation coating, permitting additional interaction between the components of the magnet. The preferred coupling agents for application in the invention provide thermal stability to the magnet and limit oxidation.

Organosilane coupling agents have been used extensively for organic-inorganic systems within aqueous and/or alcohol-rich solutions, due to their reactivity with surface hydroxyl chemical groups present on filler particles such as glass fibers, metal hydroxides, silica and silicates. A monolayer of reacted organosilane is formed on the filler surface through condensation, following the hydrolysis reaction in water.

The amine-based silanes, or aminosilanes, are among the most commonly used silanes, due to the high reactivity between the lone pair electrons that reside on a nitrogen atom of primary, secondary and tertiary amines and the epoxide functional group of epoxy resins. The aforementioned reaction of the silane with the inorganic filler particle couples those two entities together, and the epoxy-amine reaction establishes a bond between the silane and epoxy resin. Ultimately, this creates a crosslinked structure involving every reactable component of the system.

Due to their greater coupling effect and ease of reaction with filler particles in the absence of a solvent, organotitanate and organozirconates (which have similar reaction mechanisms) have received more attention than organosilanes in some respects. The organosilanes offer typically a single coupling site on the molecule with a single hydroxyl group on the filler particle, depending upon the extent of the hydrolysis and condensation reactions during pretreatment. The organotitanates or organozirconates allow at best three coupling sites, giving rise to more complete coverage of a monolayer. In addition to this information, organotitanates can also react with surface protons of inorganic filler particulates that may be devoid of hydroxyl groups. The organotitanate or organozirconate is also found to aid in the curing process to create the bonded magnet, possibly by aiding in the cross-linking process. These agents can be applied to filler surfaces via solvent-blending or direct melt-blending processes with the polymer binder and inorganic filler within a compounder or injection molder, which require no pretreatment. This invention focuses on the solvent-blending or liquid coating method of application.

Because of the efficiency of these organic coupling agents, concentrations that range between 0.1 and 1.0% (by weight) are sufficient for optimal properties (e.g. enhanced processing, mechanical strength, adhesion, and chemical resistance). This statement is particularly important for the manufacture of polymer-bonded magnets. The more coupling agents added to the system, then the lower the potential magnetic strength of the magnet will be, since the magnetic flux is directly related to the amount of magnetic material present. The use of small amounts of the coupling agents allows appropriate coupling with minimal reduction of magnetic properties. Typical thicknesses of coupling agents are on the order of one micron at these concentrations mentioned.

New materials are being added to polymeric systems called "nanofillers" or "nanoadditives" and are showing remarkable improvements in a system's thermal stability, mechanical strengths, oxygen permeability and processability. These additives are primarily inorganic and consist of a silica-based structure with organic functionalities. At least one of the spatial dimensions of said nanofillers is of the nanometer range (0.001 to 0.1 microns). With this minute dimension the aspect ratios tend to be on the order of 100 to 1000, which give rise to the mentioned improvements in overall properties. Typical concentrations of these nanofillers can vary within 0.1 to 10.0% by weight relative to the polymer binder. Examples of a currently used nanofiller material are clay fillers (typically bentonite or montmorillonite). This material is modified, for example, with alkyl ammonium salts in order to guarantee proper compatibility with the matrix material. These "organoclays" are a popular new addition to the growing field of polymer nanocomposites for both thermosetting and thermoplastic systems. Specifically for thermosets, organoclays have been effectively incorporated either through high-shear melt or solvent blending. Effective dispersion of the organoclays' silicate layers throughout the polymer phase yields favorable property enhancement.

Another family of the nanofillers distinction that has lately received much attention has the general name of polyhedral oligomeric silsesquioxanes or POSS. Polyhedral oligomeric silsesquioxanes or POSS are referred to herein as "POSS additives." These compounds are comprised of nano-sized silica-based cages with a vast number of organic functionalities. Proper selection of the most appropriate functionality, whether reactive or inert, can allow many polymeric systems to become hybridized into unique polymer nanocomposites.

Through liquid coating with the organotitanates and/or organozirconates, nanofillers (e.g., organoclays, POSS additives) and antioxidants in the presence of an epoxy resin, dicyandiamide hardener, tertiary amine accelerator, and zinc stearate lubricant, the present invention provides a high-volume fraction bonded magnet by way of compression or compaction molding. The methods of the present invention retain the organotitanate coupling agent in the mixture during and after the steps of mixing the coating compositions with the magnet powder, as it is found that such intimate mixing between organotitanate and various components aids in yielding epoxy-bonded magnets with enhanced performance, such as improved flux aging loss. In specific embodiments of the present invention, the organotitanate or organozirconate coupling agent are admixed with the other constituents of the coating formulation. In other embodiment of the invention, the organotitanate or organozirconate coupling agent can be added to the magnet powder in a pre-coating step before introduction of the other constituents of the coating formulation.

The addition of accelerator in the coating formulations of the present invention reduces the curing temperature for creating the bonded magnet from a temperature on the order of around 200° C. or more to a temperature of around 170° C. The lower curing temperature reduces the possibility of oxidation of the magnet material during the formation of the bonded magnet. This is beneficial for providing a bonded magnet with a lower flux aging loss, and better performance.

The addition of the lubricant results in lower ejection pressures for removing the bonded magnet from the die press, which helps prolong the life of the die press.

The present invention also provides a coating formulation applicable to rare earth-transition metal-boron (RE-TM-B) magnet powders, such as neodymium-iron-boron type magnetic powders manufactured from rapid solidification processes for, among other things, the purpose of corrosion and oxidation resistance when exposed to aggressive environments. The coating formulation preferably contains an epoxy binder, curing agent, an accelerating agent, and a lubricant. By incorporating coupling agents and optionally, other specialty additives with the magnetic powder and the organic epoxy components additional oxidation and corrosion prevention, enhanced adhesion and dispersion between the filler and matrix phases can be achieved. This invention is applicable to all such rare earth-transition metal-boron (RE-TM-B) magnet powders produced by rapid solidification and encompasses both the bonded magnet products that consist of combinations of the materials mentioned and the application processes. Experimental testing of the magnets of the present invention revealed the exceptional properties derived from the coating formulations of the invention.

Solvent or liquid coating is an effective manner in which each organic component can be blended with solid filler particles. It has been discovered that applying a low-viscosity, volatile carrier fluid containing dissolved low-molecular weight binder components and additives effectively allows the deposition of a protective, organic layer on the magnetic powders under ambient or moderate-temperature conditions. This procedure ensures a fast and simple production of compression moldable, liquid-coated, RE-TM-B powders for high-temperature applications.

In another aspect, the present invention provides rapidly solidified rare earth-transition metal-boron (RE-TM-B) type magnetic materials with a protective passivation coating for high temperature and aggressive environment exposure. The bonded magnets are formed from the coated magnetic powders that have been compacted and subsequently cured. The resulting bonded magnets, that arise from the liquid coating process, including organotitanate coupling agents in the epoxy system, show significant improvement in flux loss aging as compared to magnets made without coupling agent at temperatures or exceeding 180° C. FIG. 1 shows the stark contrast in flux aging loss at 180° C. after 100 hours between magnets (operating at a load line PC=2) formulated in the absence of coupling agents (No CA) or that have been liquid-coated with an organotitanate or organozirconate agent (LICA 38, KZ OPPR, KR 55). The presence of the organic coupling agent reduces the degree of oxidation of these powders, making them suitable for numerous high temperature/corrosive environment applications. Five embodiments of the present invention are disclosed, including one non-coupled magnetic powder system and four coupled magnetic powder systems for passivation. The exemplary coupled systems include a coupling agent-coated powder, a coupling agent-epoxy-coated powder and two coupling agent-nanoadditive-coated powders.

In many embodiments, the present invention provides a magnetic material that has been rapidly solidified then thermally annealed, preferably within the temperature range of 300° C. to 800° C. for about 0.5 to about 120 minutes. The magnetic material has the composition, in atomic percentage, of $R_u Fe_{100-u-v-w-x-y} Co_v M_w B_x$, wherein R is any rare earth element including yttrium; M is one or more of Zr, Nb, Ti, Cr, V, Mo, W, Hf, Al, Mn, Cu, and Si. Further, the values for u, v, w and x are as follows: $7 \leq u \leq 13$, $0 \leq v \leq 20$, $0 \leq w \leq 7$ and $4 \leq x \leq 10$. In addition, the magnetic material exhibits a remanence $(B_r)$ value from about 6 to about 12 kG and an intrinsic coercivity $(H_{ci})$ value from about 5.0 to about 15 kOe.

Any number of thermosetting polymer binders may be selected, such as, urea formaldehyde (amino resins), phenolics, thermosetting polyurethane resins, alkyd resins, or epoxy resins. Curing agents or hardeners contain functional groups that react with functional groups of the resin and are required to cause the crosslinking or cure reaction. Examples of curing agents are aliphatic (linear), cycloaliphatic, tertiary, and aromatic amines; amine adducts; amidoamines; polyamides; or anhydrides. Typically, these agents are added to the resin at about 1 to 6 phr (per hundred parts resin), depending on the desired extent of cure of the final crosslinked product. The accelerator, which increases the reactivity of the curing agent, can be a tertiary amine, e.g. imidazole, amine adduct, or amine-based complex, e.g. $BF_3$ mono-ethylamine complex. Accelerator concentrations fall within the range of 1 to 4 phr. For ease of processing, a lubricant such as fatty acids, metal (e.g., zinc or calcium) stearates, fluoropolymer resins, polyolefin or polyester resins, etc. is used. Typically lubricants are measured relative to the amount of solid filler present. The concentration range of lubricant may be 0.01 to 0.5 phf (per hundred parts filler) and is dependent on the desired final properties of the resulting bonded magnet. Antioxidant concentrations tend to exist within the range of 0.5 to 1.5 phr (per hundred parts resin), and are useful for oxygen radical consumption in a system.

The appropriate amounts of coupling agent and nanofiller (e.g., organoclay and POSS additive) for a specific system are determined empirically for optimization of its final desired magnet properties. Preferably the concentration ranges of coupling agent, organoclays and POSS additive added to the entire system should fall within 0.1 to 1.0% by weight (based on amount of binder and filler), 1.0 to 10.0% by weight (based on amount of resin), and 0.1 to 1.0% by weight (based on amount of binder and filler), respectively.

In a specific embodiments, a multifunctional epichlorohydrin/cresol novolac epoxy resin, with a dicyandiamide curing agent, a tertiary amine accelerator and zinc stearate lubricating agent in the polymer binder system are used for compression-molding purposes both including and excluding coupling agent. Any of the following coupling agents are applicable to this invention: organosilanes, organotitanates, organozirconates, and organozircoaluminates. For these embodiments the recommended coupling agents for the epoxy-bonded RE-TM-B magnets are the organotitanates and organozirconates, which are of the general form $$(RO-)_n Ti(-OXR'Y)_{4-n}$$

and $$(RO-)_n Zr(-OXR'Y)_{4-n}$$

The RO is the hydrolyzable group that reacts with surface protons or hydroxyl groups, where R may be short or long chained alkyls (monoalkoxy) or unsaturated allyls (neoalkoxy). Ti and Zr are typically tetravalent titanium and zirconium atoms, respectively, where both may have higher or lower valence as well. X is the binder functional groups, such as phosphato, phosphito, pyrophosphato, sulfonyl, carboxyl, etc. R' is the thermoplastic functional group such as: aliphatic and non-polar isopropyl, butyl, octyl, isostearoyl groups; napthenic and mildly polar dodecylbenzyl groups; or aromatic benzyl, cumyl phenyl groups. Y is the thermosetting functional group that typically is reactive, e.g. amino or vinyl groups. n represents the functionality of the molecule. A functionality of n=2 implies that there exist two reactive hydrolyzable groups and two organofunctional groups for compatibility with the polymer binder. Examples of the various functionalities of these coupling agents are displayed in Table 1. The liquid coupling agent organotitanates and organozirconates with pyrophosphato and phosphito binder functional groups were found to be most effective for to oxidation resistance, due to their reactive nature with surface protons and hydroxyls present on the magnetic powders surfaces.

ity in the following solvents: isopropanol, xylene, toluene, dioctyl phthalate and ketones. Other coupling agents of different functionality may have limited solubility in most conventional solvents. When using the recommended components in this invention, acetone has proven to be a very acceptable carrier fluid, for both coupled and non-coupled systems, because of its ability to dissolve the ingredients well and high vapor pressure at ambient temperature.

Various embodiments of the invention contain and/or require a proper mixing procedure in order to obtain optimal characteristics. In the first embodiment of the present invention, the RE-TM-B magnet powders are coated with a homogeneous solution of the epichlorohydrin/cresol novolac epoxy resin, a dicyandiamide curing agent, a tertiary amine accelerator and zinc stearate lubricating agent in acetone. Once added to the organics solution, mixing of the RE-TM-B magnet powders continues while the mixture is heated above room temperature for solvent removal.

In the second embodiment of the present invention, a coupling agent is incorporated with the RE-TM-B magnet powders through a precoating process. An organotitanate-acetone solution is added to the magnetic powders and stirred followed by the subsequent evaporation of acetone. The pretreated RE-TM-B powders are then subjected to the mixing procedure as in the first embodiment that includes the epoxy system organic components.

In the third embodiment of the present invention, the organotitanate coupling agent is incorporated with the RE-TM-B magnet powders and the epoxy system organic components through an admixing process. The RE-TM-B magnet powders are blended with a homogeneous acetone solution of the

TABLE 1

Functional groups of organotitanate and organozirconate coupling agents

| Symbol | Chemical Group | Chemical Name | Titanate Type | n |
|---|---|---|---|---|
| R | $(CH_3)_2$—HC— | isopropyl | monoalkoxy | 1-4[†] |
|  | $H_3$C— | methyl | monoalkoxy | 1 |
|  | $C_7H_{15}$—$H_2$C— | octyl | alkoxy | 1-4 |
|  | $CH_3CH_2C(CH_2OCH_2CH=CH_2)$—$H_2$C— $CH_2=CHCH_2OCH_2$ | 2,2-diallyloxymethyl | allyloxy | 4 |
|  | $CH_3CH_2C$—$H_2$C— $CH_2=CHCH_2OCH_2$ | neopentyl(diallyl)oxy | neoalkoxy | 1 |
| R', X, Y | —(C=O)$C_{17}H_{35}$ | isostearoyl | monoalkoxy | 3 |
|  | —(C=O) C($CH_3$)=$CH_2$ | methacryl | monoalkoxy | 2-3 |
|  | —(O=S=O)-AR-$C_{12}H_{25}$ | dodecylbenzenesulfonyl | monoalkoxy | 3 |
|  | —(HO—P=O)—O—(P=O)—$(C_8H_{17})_2$ | pyrophosphato | neoalkoxy | 3 |

[†]The titanium and zirconium atoms may have coordination numbers greater than 4.
AR is an aromatic benzene unit.
The italicized, bold-type atom is the primary connecting atom of the functional segment. Information taken from Ken React Reference Manual.

Figure 2:
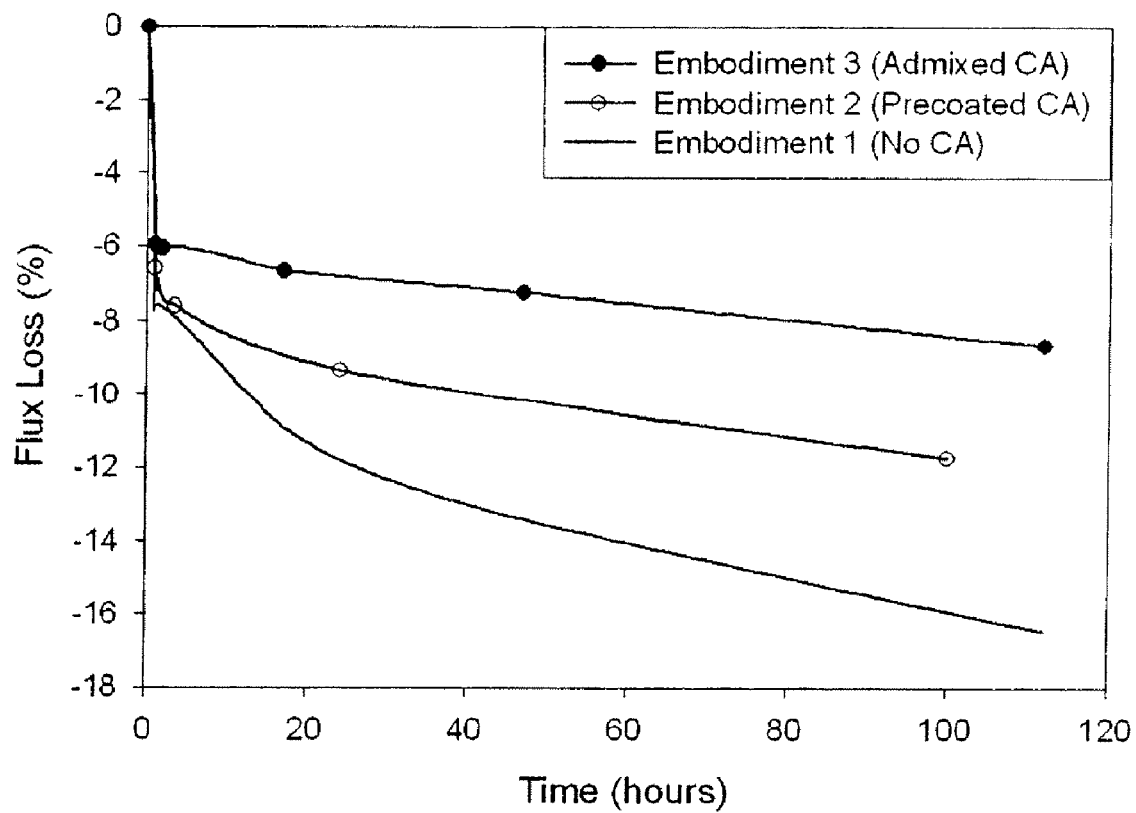
FIG. 2: A comparison of the flux aging loss for cured PC-2 magnets of each embodiment aged at 180° C. for 100 hours.

The liquid coating process requires an appropriate solvent for proper dissolution of the organic resin, hardener, accelerator, lubricant and coupling agent. Polar protic solvents, such as, alkanols or alkoxy-based alcohols and aprotic solvents, such as, ketones, aromatics, and glycol-based ethers are useful for epoxy resin dissolution. Protic solvents may not always be advisable, due to the possible side reaction of a proton-donating solvent molecule with the epoxide group of the resin monomer. Since most amine-based curing agents and accelerators are polar molecules, the aforementioned solvents could be appropriate for these components. Stearates or fatty acids are also polar since they contain the carboxylate ion. Many of the organotitanates and organozirconates can vary in solubility with particular solvents. The pyrophosphato-, phosphato-, and phosphito-functional titanates/zirconates, due to their aprotic polarity, have very good solubilepichlorohydrin/cresol novolac epoxy resin, a dicyandiamide curing agent, a tertiary amine accelerator, zinc stearate lubricating agent, and the coupling agent. The relative amounts of the resin, curing agent, accelerator and lubricant are reduced accordingly in order to maintain an RE-TM-B powder mass percent of 98.3% when incorporating the coupling agent. FIG. 2 shows a plot of the flux aging loss results for cured magnets according to the first, second and third embodiments of the present invention.

As can be seen in FIG. 2, the magnetic material according to the second embodiment (Precoated CA) exhibits Unproved properties over the magnetic material of the first embodiment (No CA) due to the incorporation of the coupling agent (CA) through precoating the magnet powders. Furthermore, an enhancement of the flux aging loss of the RE-TM-B powders is attained when the organotitanate is admixed with the epoxy system components, as seen in FIG. 2 for the third embodiment (Admixed CA).

Figure 3:
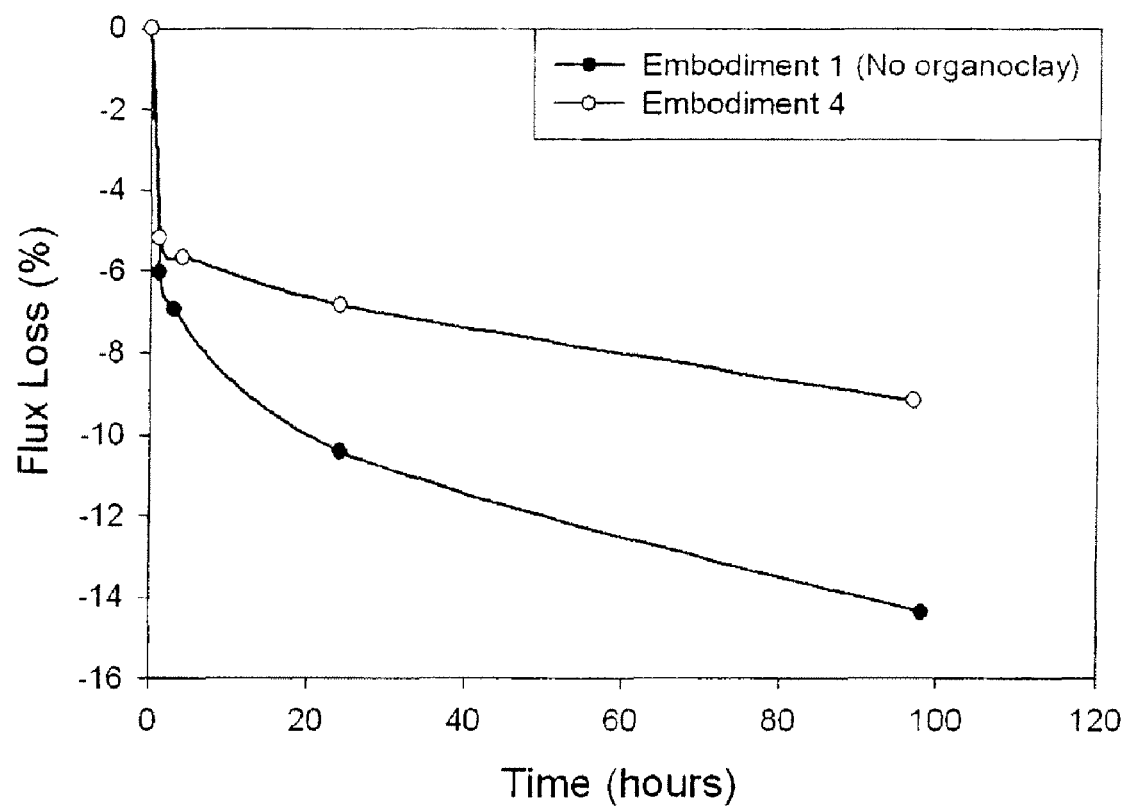
FIG. 3: A comparison of the flux aging loss for cured PC-2 magnets of first and fourth embodiments aged at 180° C. for 100 hours.

The magnetic material according to the fourth embodiment of the present invention has a similar formulation to the magnetic material of the third embodiment, but differs due to the addition of bentonite clay powder that has been chemically treated to contain bis (hydroxyethyl) methyl tallow alkyl ammonium salts within the admixing acetone solution. The relative amounts of the resin, curing agent, accelerator and lubricant are reduced accordingly in order to maintain a magnetic powder weight percent of 97.6% when incorporating the organoclays. FIG. 3 shows a plot of the flux aging loss results for cured magnets according to the first and fourth embodiments of the invention. The incorporation of the additive of the treated bentonite clay powder within the admixing acetone solution results in a significant improvement in the flux loss of the magnetic material according to the fourth embodiment as compared to the first embodiment.

Figure 4:
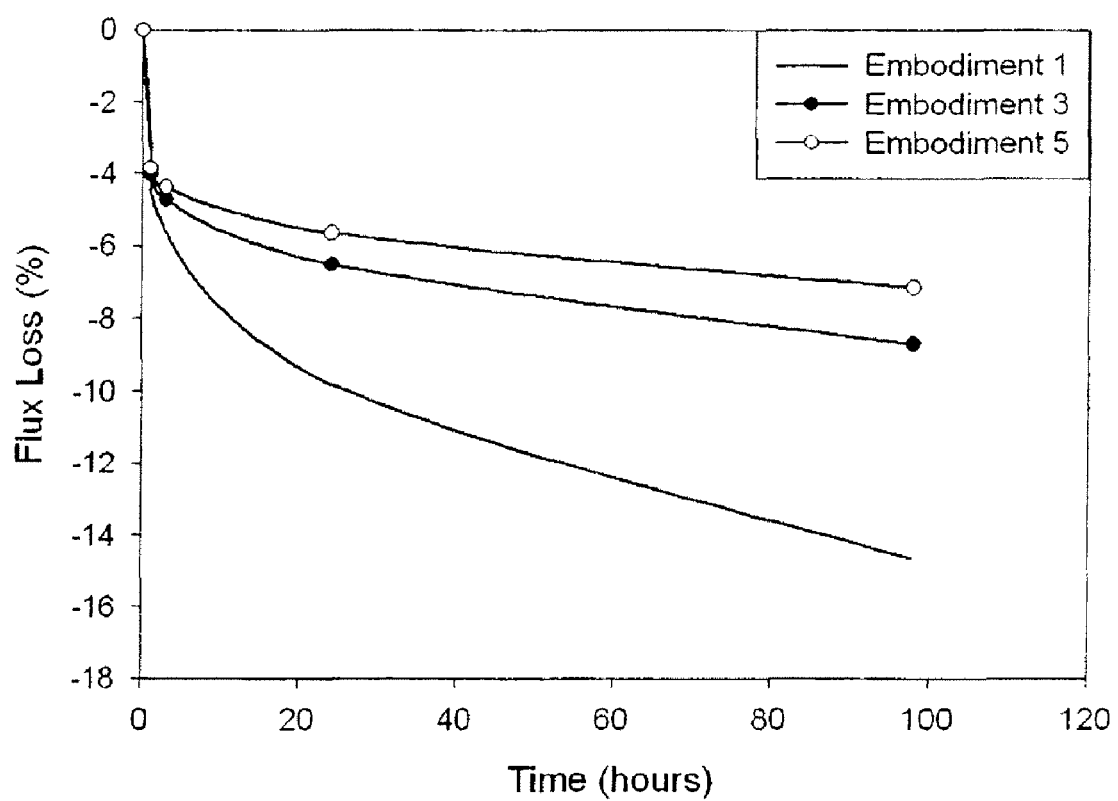
FIG. 4: A comparison of the flux aging loss for cured PC-2 magnets of first, third and fifth embodiments aged at 200° C. for 100 hours.

The magnetic material according to the fifth embodiment of the present invention has a similar formulation to the magnetic material of the fourth embodiment, but differs due to the initial precoating of a silanol-POSS with phenyl group functionality on the magnetic powders. A POSS-tetrahydrofuran (THF) solution is added and then stirred with the magnetic powders, followed by the evaporation of the THF solvent. The pretreated powders are then subjected to the mixing procedure in the fourth embodiment with admixing the organics-acetone solution. The relative amounts of the resin, curing agent, accelerator and lubricant are reduced accordingly in order to maintain a magnetic powder weight percent of 97.6% when incorporating the organoclays. FIG. 4 shows the improved flux aging loss results for cured magnets according to the fifth embodiment as compared to the cured magnets of the first and third embodiments.

EXAMPLES

Example 1

Commercially available MQP™-B powder is liquid-coated with an epichlorohydrin/cresol novolac epoxy resin EPON 164™ (Shell Chemical Company), dicyandiamide curing agent (SKW Trostberg), a tertiary amine accelerator, Fenuron™, (SKW Trostberg), and zinc stearate in a 8% acetone solution. The resin, curing agent, accelerator, and zinc stearate are added together with the acetone in a glass 500 mL beaker. The mixture is stirred periodically in order to produce a homogeneous solution of the organic components. The MQP™-B powder is subsequently added to the solution, allowing the addition of more acetone to sufficiently immerse the powders in the solution (roughly 1 mL of acetone per 5 grams of MQP powder). The overall proportions and compositions of the components are shown in Table 1a. The beaker containing the mixture is then placed on a hot plate and heated at 50° C. The contents are periodically stirred while the acetone evaporates. For complete drying the powders are removed from the beaker and spread evenly on a flat surface within a fume hood.

TABLE 1a

| Component | Mass (g) | Weight Percent (%) |
|---|---|---|
| Example 1 | | |
| MQP ™-B | 100.0 | 98.272 |
| EPON 164 Resin | 1.600 | 1.572 |
| Dicyandiamide | 0.096 | 0.094 |

TABLE 1a-continued

| Component | Mass (g) | Weight Percent (%) |
|---|---|---|
| Accelerator | 0.032 | 0.031 |
| Zinc Stearate | 0.030 | 0.029 |

Example 2

Commercially available MQP™-B powder is liquid-coated with 0.6% LICA 38™ (Kenrich Petrochemicals, Inc.) (see Table 2). The coupling agent is added to acetone in a glass 500 mL beaker creating a 50% solution. The MQP™-B powder is added to the solution, allowing the addition of more acetone to sufficiently immerse the powders in the solution. The compositions of the components are shown in Table 3. The beaker containing the mixture is then placed on a hot plate and is heated at 50° C. The contents are periodically stirred while the acetone evaporates. For complete drying the powders are removed from the beaker and spread evenly on a flat surface within a fume hood.

TABLE 2

Organotitanate/Organozirconate Coupling agent Nomenclature

| Coupling Agent | Chemical Name |
|---|---|
| LICA 38 ™ | neopentyl(diallyl)oxy-tri(dioctyl) pyrophophato titanate |
| KR 55 ™ | tetra(2,2-diallyoxymethyl)butyl-di(ditridecyl)phosphito titanate |
| KR 238M ™ | methacrylate functional amine adduct of di(dioctyl)pyrophosphate ethylene titanate |
| KZ OPPR ™ | cyclo (dioctyl) pyrophosphato dioctyl zirconate |
| SIA0610 ™ | γ-aminopropyltriethoxysilane |

TABLE 3

| Composition of Example 2 | | |
|---|---|---|
| Component | Mass (g) | Weight Percent (%) |
| Example 2 | | |
| MQP ™-B | 100.0 | 99.393 |
| LICA 38 ™ | 0.611 | 0.607 |

Example 3

Commercially available MQP™-B powder is pre-coated with LICA 38™ (Kenrich Petrochemicals, Inc.) before further liquid-coating with an epichlorohydrin/cresol novolac epoxy resin EPON 164™ (Shell Chemical Company), dicyandiamide curing agent (SKW Trostberg), a tertiary amine accelerator, Fenuron™, (SKW Trostberg), and zinc stearate in a 8% acetone solution. The coupling agent is added together with the acetone in a glass 500 mL beaker in a 50/50 solution. The mixture is stirred periodically in order to produce a homogeneous solution of the organic components. The MQP™-B powder is subsequently added to the solution, allowing the addition of more acetone to sufficiently immerse the powders in the solution. The overall proportions and compositions of the powder and coupling agent are shown in Table 3. The beaker containing the mixture is then placed on a hot plate and is heated at 50° C. The contents are periodically stirred while the acetone evaporates. For complete drying the powders are removed from the beaker and spread evenly on a flat surface within a fume hood. Following the drying step, the precoated powders are added to the 8% acetone solution with epoxy resin, curing agent, accelerator, and zinc stearate. The acetone is then allowed to evaporate while the powder-organics-acetone mixture is periodically stirred. Table 4 shows the respective amounts of each component.

TABLE 4

Compositions of Example 3 and 4

| Component | Mass (g) | Weight Percent (%) |
|---|---|---|
| Examples 3 and 4 | | |
| MQP ™-B | 100.0 | 98.272 |
| EPON 164 Resin | 1.044 | 1.026 |
| Dicyandiamide | 0.063 | 0.062 |
| Accelerator | 0.021 | 0.021 |
| Zinc Stearate | 0.020 | 0.019 |
| LICA 38 ™ | 0.611 | 0.600 |

Example 4

Commercially available MQP™-B powder is admixed with LICA 38™ (Kenrich Petrochemicals, Inc.), an epichlorohydrin/cresol novolac epoxy resin EPON 164™ (Shell Chemical Company), dicyandiamide curing agent (SKW Trostberg), a tertiary amine accelerator, Fenuron™, (SKW Trostberg), and zinc stearate in a 8% acetone solution. The resin, curing agent, accelerator, zinc stearate and titanate are added together with acetone in a glass 500 mL beaker, creating a 8% organics solution. The mixture is stirred periodically in order to produce a homogeneous solution of the organic components. The MQP™-B powder is subsequently added to the solution, allowing the addition of more acetone to sufficiently immerse the powders in the solution (see Table 4 for compositions). The beaker containing the mixture is then placed on a hot plate and is heated at 50° C. The contents are periodically stirred while the acetone evaporates. For complete drying the powders are removed from the beaker and spread evenly on a flat surface within a fume hood. FIG. 1 shows the flux aging loss results of magnets following this recipe compared to other organotitanates or organozirconates or no coupling agent at all. FIG. 2 shows a comparison of the products of the liquid-coating methods in the absence of a coupling agent (Example 1), precoated MQP™-B with coupling agent (Example 3), and admixed MQP™-B with coupling agent, as described in the first and second embodiments of the invention.

Figure 5:
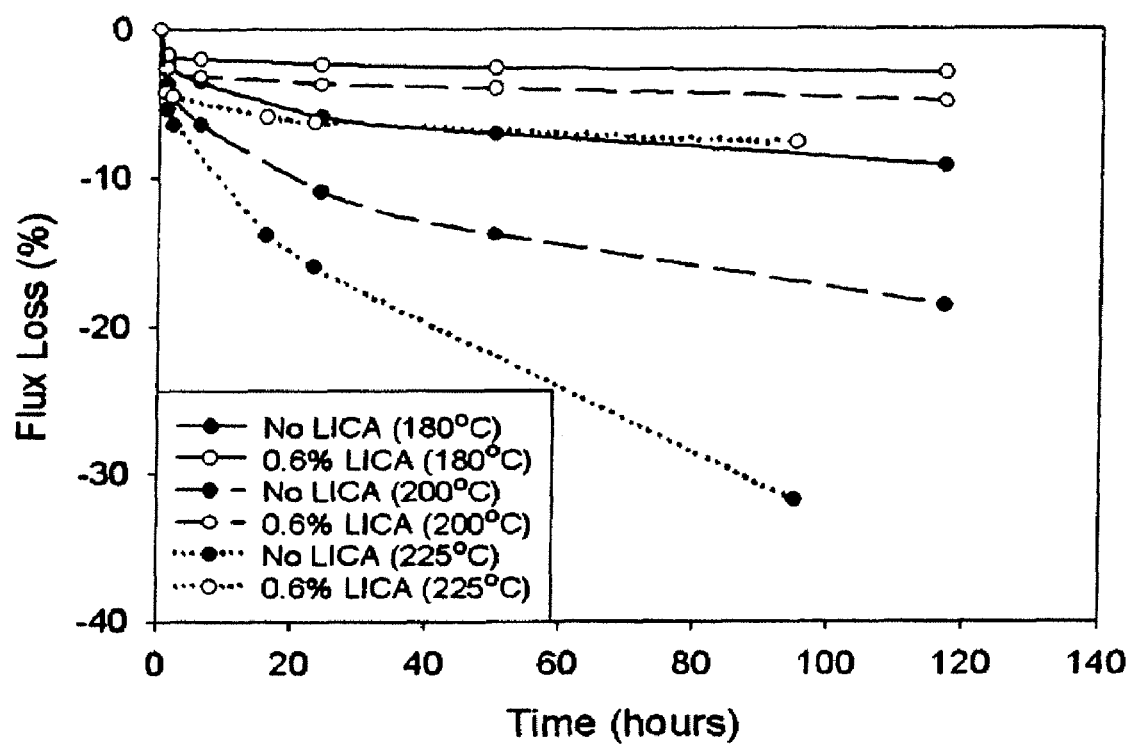
FIG. 5. Flux aging loss of MQP 14-12™ bonded magnets with and without LICA 38 coupling agent after 100 hours at 180, 200, and 225° C.

This method is also performed under the same conditions by using MQP™-14-12 powders. FIG. 5 displays the flux aging results at various temperatures for MQP™-14-12 magnets in the absence of comprised of LICA 38™ (No LICA), and including 0.6% LICA 38™.

Example 5

Commercially available MQP™-B powder is admixed with KR 55™ (Kenrich Petrochemicals, Inc.), an epichlorohydrin/cresol novolac epoxy resin EPON 164™ (Shell Chemical Company), dicyandiamide curing agent (SKW Trostberg), a tertiary amine accelerator, Fenuron™, (SKW Trostberg), and zinc stearate in a 8% acetone solution. The resin, curing agent, accelerator, zinc stearate and titanate are added together with acetone in a glass 500 mL beaker, creating a 8% organics solution. The mixture is stirred periodically in order to produce a homogeneous solution of the organic components. The MQP™-B powder is subsequently added to the solution, allowing the addition of more acetone to sufficiently immerse the powders in the solution (see Table 5 for compositions). The beaker containing the mixture is then placed on a hot plate and is heated at 50° C. The contents are periodically stirred while the acetone evaporates. For complete drying the powders are removed from the to beaker and spread evenly on a flat surface within a fume hood. FIG. 1 shows the flux aging loss results of magnets following this recipe compared to other organotitanates or organozirconates or no coupling agent at all.

TABLE 5

Compositions of Example 5

| Component | Mass (g) | Weight Percent (%) |
|---|---|---|
| Example 5 | | |
| MQP ™-B | 100.0 | 98.272 |
| EPON 164 Resin | 1.137 | 1.117 |
| Dicyandiamide | 0.068 | 0.067 |
| Accelerator | 0.023 | 0.022 |
| Zinc Stearate | 0.021 | 0.021 |
| KR 55 ™ | 0.509 | 0.500 |

Example 6

Commercially available MQP™-B powder is admixed with KZ OPPR™ (Kenrich Petrochemicals, Inc.), an epichlorohydrin/cresol novolac epoxy resin EPON 164™ (Shell Chemical Company), dicyandiamide curing agent (SKW Trostberg), a tertiary amine accelerator, Fenuron™, (SKW Trostberg), and zinc stearate in a 8% acetone solution. The resin, curing agent, accelerator, zinc stearate and titanate are added together with acetone in a glass 500 mL beaker, creating a 8% organics solution. The mixture is stirred periodically in order to produce a homogeneous solution of the organic components. The MQP™-B powder is subsequently added to the solution, allowing the addition of more acetone to sufficiently immerse the powders in the solution (see Table 6 for compositions). The beaker containing the mixture is then placed on a hot plate and heated at 50° C. The contents are periodically stirred while the acetone evaporates. For complete drying the powders are removed from the beaker and spread evenly on a flat surface within a fume hood. FIG. 1 shows the flux aging loss results of magnets following this recipe compared to other organotitanates or organozirconates or no coupling agent at all.

TABLE 6

Compositions of Example 6

| Component | Mass (g) | Weight Percent (%) |
|---|---|---|
| Example 6 | | |
| MQP ™-B | 100.0 | 98.272 |
| EPON 164 Resin | 1.137 | 1.117 |
| Dicyandiamide | 0.068 | 0.067 |
| Accelerator | 0.023 | 0.022 |
| Zinc Stearate | 0.021 | 0.021 |
| KZ OPPR ™ | 0.509 | 0.500 |

Example 7

Figure 6:
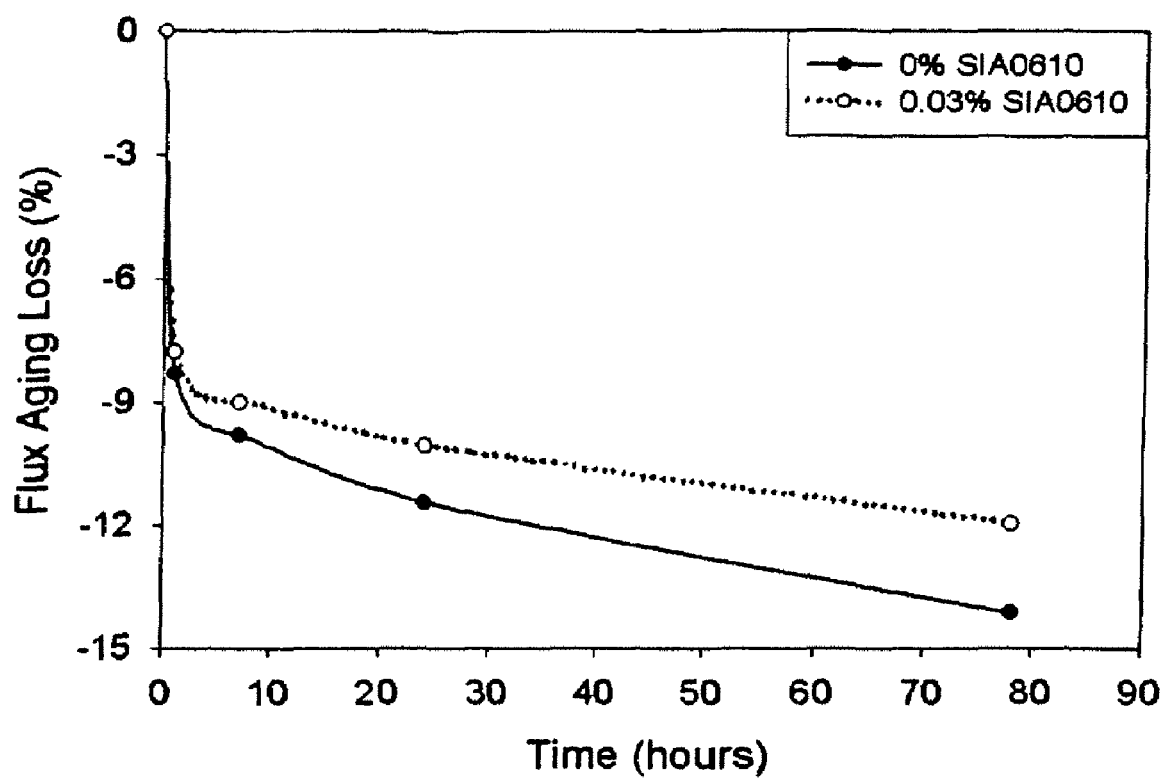
FIG. 6. Flux aging loss of non-silanated and silanated MQP-B™ liquid-coated magnets at 180° C. after 78 hours.

Commercially available MQP™-B powder is pretreated in a 0.5% aqueous solution of the aminosilane SIA0610™ (Gelest). The powders are stirred for 10 minutes, and then they are placed in an oven at 110° C. for 30 minutes followed by drying under a fume hood for 24 hours. An 8% solution of an epichlorohydrin/cresol novolac epoxy resin EPON 164™ (Shell Chemical Company), dicyandiamide curing agent (SKW Trostberg), a tertiary amine accelerator, Fenuron™, (SKW Trostberg), and zinc stearate in a acetone is prepared in a glass 500 mL beaker. Stirring of the mixture is performed periodically in order to produce a homogeneous solution of the organic components. The dry silane-coated powders are subsequently added to the acetone solution, allowing the addition of more acetone to sufficiently immerse the powders in the solution. The overall proportions and compositions of the components are shown in Table 7. The beaker containing the mixture is then placed on a hot plate and heated at 50° C. The contents are periodically stirred while the acetone evaporates. For complete drying the powders are removed from the beaker and spread evenly on a flat surface within a fume hood. FIG. 6 shows a comparison the flux aging loss of untreated (uncoupled) MQP™-B and SIA0610-coated MQP™-B that have been subjected to the liquid-coating process.

TABLE 7

Compositions of Example 7

| Component | Mass (g) | Weight Percent (%) |
|---|---|---|
| Example 7 | | |
| MQP ™-B | 100.0 | 98.272 |
| EPON 164 Resin | 1.137 | 1.550 |
| Dicyandiamide | 0.068 | 0.094 |
| Accelerator | 0.023 | 0.031 |
| Zinc Stearate | 0.021 | 0.029 |
| SIA0610 ™ | 0.031 | 0.030 |

Example 8

Commercially available MQP™-B powder is admixed with organotitanate LICA 38™ (Kenrich Petrochemicals, Inc.), an epichlorohydrin/cresol novolac epoxy resin EPON 164™ (Shell Chemical Company), dicyandiamide curing agent (SKW Trostberg), a tertiary amine accelerator, Fenuron™, (SKW Trostberg), zinc stearate, and organoclay Cloisite 30B™ (Southern Clay Products) in a 8% acetone solution. The resin, curing agent, accelerator, zinc stearate, organotitanate, and organoclay are added together with acetone in a glass 500 mL beaker. The mixture is stirred periodically in order to produce a homogeneous solution of the organic components. The MQP™-B powder is subsequently added to the solution, allowing the addition of more acetone to sufficiently immerse the powders in the solution (see Table 8 for compositions). The beaker containing the mixture is then placed on a hot plate and heated at 50° C. The contents are periodically stirred while the acetone evaporates. For complete drying the powders are removed from the beaker and spread evenly on a flat surface within a fume hood.

TABLE 8

Composition of Example 8

| Component | Mass (g) | Weight Percent (%) |
|---|---|---|
| Example 8 | | |
| MQP ™-B | 100 | 97.605 |
| EPON 164 Resin | 1.457 | 1.422 |
| Dicyandiamide | 0.087 | 0.085 |
| Accelerator | 0.029 | 0.028 |
| Zinc Stearate | 0.091 | 0.089 |
| LICA 38 ™ | 0.615 | 0.600 |
| Cloisite 30B ™ | 0.175 | 0.171 |

Example 9

Commercially available MQP™-B powder is precoated with a trisilanolphenyl POSS™ additive (Hybrid Plastics) before further liquid-coating with an epichlorohydrin/cresol novolac epoxy resin EPON 164™ (Shell Chemical Company), dicyandiamide curing agent (SKW Trostberg), a tertiary amine accelerator, Fenuron™, (SKW Trostberg), zinc stearate, an organotitanate LICA 38™ (Kenrich Petrochemicals, Inc.) an organoclay Cloisite 30B™ (Southern Clay Products), and an antioxidant Ralox LC™ (Degussa, butylated reaction product of p-cresol and dicyclopentadiene) in a 8% acetone solution. The resin, curing agent, accelerator, zinc stearate, organotitanate, organoclay and antioxidant are added together with acetone in a glass 500 mL beaker. The mixture is stirred periodically in order to produce a homogeneous solution of the organic components. The MQP™-B powder is subsequently added to the solution, allowing the addition of more acetone to sufficiently immerse the powders in the solution (see Table 9 for compositions). The beaker containing the mixture is then placed on a hot plate and heated at 50° C. The contents are periodically stirred while the acetone evaporates. For complete drying the powders are removed from the beaker and spread evenly on a flat surface within a fume hood.

TABLE 9

Composition of Example 9

| Component | Mass (g) | Weight Percent (%) |
|---|---|---|
| Example 9 | | |
| MQP ™-B | 100.0 | 97.605 |
| EPON 164 Resin | 1.050 | 1.025 |
| Dicyandiamide | 0.063 | 0.061 |
| Accelerator | 0.021 | 0.020 |
| Zinc Stearate | 0.066 | 0.064 |
| LICA 38 ™ | 0.130 | 0.490 |
| Cloisite 30B ™ | 0.615 | 0.600 |
| Trisilanolphenyl POSS ™ | 0.500 | 0.123 |
| Ralox LC ™ | 0.011 | 0.011 |

MISCELLANEOUS

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

REFERENCES CITED

All references cited herein are incorporated herein by reference in their entirety and for all purposes to the same extent as if each individual publication or patent or patent application was specifically and individually indicated to be incorporated by reference in its entirety for all purposes.

What is claimed is:

1. A process of making a liquid-coated rapidly solidified rare earth-transition metal-boron magnet material, the process comprising:
   providing a homogeneous solution comprising a solvent, one or more of an organotitanate or organozirconate coupling agents, an epoxy resin, a hardener, an accelerator, and a lubricant;
   combining a rare earth-transition metal-boron magnet powder with said homogeneous solution to form a slurry mixture;
   stirring said slurry mixture periodically; and
   maintaining said slurry mixture at a temperature between 40-60° C., such that said solvent evaporates and a coating is formed on the magnet powder;
   wherein the coupling agent has a general form of $(RO-)_n(Ti\ or\ Zr)(-OR'Y)_{4-n}$ where R is a neopentyl(diallyl), dioctyl, or (2,2-diallyloxymethyl)butyl group, Ti or Zr has a coordination number of 4, R' is a phosphito, pyrophosphato or cyclic pyrophosphato segment, and Y is a dioctyl or ditridecyl end group, with $1 \leq n \leq 4$; and
   wherein the amount of the coupling agent in the coating that is formed is about 0.1 weight percent to about 1 weight percent of the coated magnet powder.

2. The process of claim 1, wherein the solvent is acetone.

3. The process of claim 1, further comprising introducing an organoclay into the homogeneous solution.

4. The process of claim 1, further comprising introducing an antioxidant agent into the homogeneous solution.

5. The process of claim 1, wherein both an organotitanate and an organozirconate coupling agent are added to the homogeneous solution.

6. The process of claim 1, wherein said slurry mixture is maintained at a temperature between 50-60° C.

7. The process of claim 1, wherein said solvent is tetrahydrofuran, and said process further comprises pre-treating the rare earth-transition metal-boron magnet powder by dissolving a POSS additive in tetrahydrofuran to form a 50% solution by weight; adding the rare earth-transition metal-boron magnet powder into the solution; and evaporating the tetrahydrofuran to produce a pre-treated rare earth-transition metal-boron powder.

8. The process of claim 1, wherein said homogeneous solution is a homogeneous 8-25% solution by weight.

9. The process of claim 1, wherein the amount of the epoxy resin in the coating that is formed is about 0.18 weight percent to about 4.46 weight percent of the coated magnet powder.

10. The process of claim 1, wherein the rare earth-transition metal-boron magnet material comprises the magnet powder in an amount of about 95 weight percent to about 99 weight percent of the magnet material.

11. The process of claim 1, wherein the rare earth-transition metal-boron magnet material is a compression-molded magnetic material.

12. A process of making a liquid-coated rapidly solidified rare earth-transition metal-boron magnet material, the process comprising:
   providing a homogeneous solution comprising a solvent, one or more of an organotitanate or organozirconate coupling agents, an epoxy resin, a hardener, an accelerator, and a lubricant;
   combining a rare earth-transition metal-boron magnet powder with said homogeneous solution to form a slurry mixture; and
   evaporating the solvent to form a coating on the magnet powder;
   wherein the coupling agent has a general form of $(RO-)_n(Ti\ or\ Zr)(-OR'Y)_{4-n}$ where R is a neopentyl(diallyl), dioctyl, or (2,2-diallyloxymethyl)butyl group, Ti or Zr has a coordination number of 4, R' is a phosphito, pyrophosphato or cyclic pyrophosphato segment, and Y is a dioctyl or ditridecyl end group, with $1 \leq n \leq 4$; and
   wherein the amount of the coupling agent in the coating that is formed is about 0.1 weight percent to about 1 weight percent of the coated magnet powder.

13. The process of claim 12, further comprising stirring said slurry mixture periodically.

14. The process of claim 12, wherein the solvent is acetone.

15. The process of claim 12, further comprising introducing an organoclay into the homogeneous solution.

16. The process of claim 12, further comprising introducing an antioxidant agent into the homogeneous solution.

17. The process of claim 12, wherein both an organotitanate and an organozirconate coupling agent are added to the homogeneous solution.

18. The process of claim 12, wherein said solvent is tetrahydrofuran, and said process further comprises pre-treating the rare earth-transition metal-boron magnet powder by dissolving a POSS additive in tetrahydrofuran to form a 50% solution by weight; adding the rare earth-transition metal-boron magnet powder into the solution; and evaporating the tetrahydrofuran to produce a pre-treated rare earth-transition metal-boron powder.

19. The process of claim 12, wherein said homogeneous solution is a homogeneous 8-25% solution by weight.

20. The process of claim 12, wherein the amount of the epoxy resin in the coating that is formed is about 0.18 weight percent to about 4.46 weight percent of the coated magnet powder.

21. The process of claim 12, wherein the rare earth-transition metal-boron magnet material comprises the magnet powder in an amount of about 95 weight percent to about 99 weight percent of the magnet material.

22. The process of claim 12, wherein the rare earth-transition metal-boron magnet material is a compression-molded magnetic material.

23. A process of making a liquid-coated rapidly solidified rare earth-transition metal-boron magnet material, the process comprising:
   providing a homogeneous solution comprising a solvent, one or more of an organotitanate or organozirconate coupling agents and an epoxy resin;
   combining a rare earth-transition metal-boron magnet powder with said homogeneous solution to form a slurry mixture; and
   evaporating the solvent to form a coating on the magnet powder;
   wherein the coupling agent has a general form of $(RO-)_n(Ti\ or\ Zr)(-OR'Y)_{4-n}$ where R is a neopentyl(diallyl), dioctyl, or (2,2-diallyloxymethyl)butyl group, Ti or Zr has a coordination number of 4, R' is a phosphito, pyrophosphato or cyclic pyrophosphato segment, and Y is a dioctyl or ditridecyl end group, with $1 \leq n \leq 4$; and
   wherein the amount of the coupling agent in the coating that is formed is about 0.1 weight percent to about 1 weight percent of the coated magnet powder.

* * * * *